United States Patent [19]

Sakamoto et al.

[11] Patent Number: 4,825,967
[45] Date of Patent: May 2, 1989

[54] WEIGHT DETECTING APPARATUS

[75] Inventors: Kazuho Sakamoto, Sohraku; Makoto Mihara, Osaka; Kenzo Ohji, Ikoma; Shuji Itou, Nara, all of Japan

[73] Assignee: Matsushita Electric Industrial Co., Ltd., Osaka, Japan

[21] Appl. No.: 117,172

[22] PCT Filed: Feb. 3, 1987

[86] PCT No.: PCT/JP87/00070
§ 371 Date: Sep. 30, 1987
§ 102(e) Date: Sep. 30, 1987

[87] PCT Pub. No.: WO87/04786
PCT Pub. Date: Aug. 13, 1987

[30] Foreign Application Priority Data

Feb. 3, 1986 [JP] Japan .................................. 61-21403
Feb. 3, 1986 [JP] Japan .................................. 61-21404

[51] Int. Cl.⁴ .............................. G01G 3/14; G01L 1/14
[52] U.S. Cl. ................................ 177/210 C; 73/862.64
[58] Field of Search ................... 177/210 C; 73/862.64

[56] References Cited

U.S. PATENT DOCUMENTS

| | | | |
|---|---|---|---|
| 3,332,506 | 7/1967 | Bradfield | 177/210 C |
| 3,678,378 | 7/1972 | Trott et al. | 177/210 C X |
| 4,440,251 | 4/1984 | Kunz | 177/210 C X |
| 4,458,770 | 7/1984 | Bucci | 177/210 C |
| 4,649,759 | 3/1987 | Lee | 177/210 C X |
| 4,744,254 | 5/1988 | Barten | 177/211 X |

Primary Examiner—George H. Miller, Jr.
Attorney, Agent, or Firm—Wenderoth, Lind & Ponack

[57] ABSTRACT

The invention detects the weight of an object by detecting the change in electrostatic capacity due to a change in the distance between electrodes caused by deflection of flat plates, by using a pressure sensitive sensor having flat plates composed of two elastic insulators stuck together across a proper gap and extending parallel to one another, with electrodes provided at the confronting sides of the flat plates, and by transferring the load of the object to be measured to the sensor through a load support. The gap between the electrodes of this pressure sensitive sensor is enclosed, and a hole is provided to allow air to pass into and out of the gap. Furthermore, the surface of the pressure sensitive sensor is coated with a water-repellent substance to eliminate current loss due to dust or dew deposited on the surface of the electrodes. As a result, the weight may be measured accurately without being effected by temperature changes or humidity.

12 Claims, 11 Drawing Sheets

WEIGHT DETECTING APPARATUS

BACKGROUND OF THE INVENTION

1. Field of the Invention

This invention relates to a scale for measuring the weight of an object. More particularly, it relates to a weight detecting apparatus as a means of enhancing the operation and performance of a device, by detecting the weight of an object and allowing the device to effectively utilize this weight information. For example, as a means that effectively utilizes the weight information, a heat cooking appliance is known, in which the cooking performance may be enhanced by detecting the weight of the food in the heating compartment and heating it at an optimum time and temperature for that weight. This invention relates to such a weight detecting apparatus.

2. Description of the Related Art

In a conventional scale, for example as shown in FIG. 1, the object to be measured is put on a tray 1, and its load is linked to a movable side spacer 3 by way of a load support 2. This spacer 3 is linked to a fixed side spacer 5 by way of leaf springs 4 vertically spaced in a parallel state. This second spacer 5 is fixed on a foundation 7 through a support 6. Two sheet metal electrodes 8 are respectively mounted on the movable side spacer 3 and the fixed side spacer 5.

When the object to be measured is put on the tray 1, the leaf springs 4 are deformed under its load, and the movable side spacer 3 side is displaced downward. As a result, the gap between the two sheet metal electrodes 8 changes, and the electrostatic capacity between the sheet metal electrodes varies. The weight is measured by detecting this change of electrostatic capacity.

However, in such a scale or weight detecting appratus of a cooking appliance, since the detection of weight depends on the electrostatic capacity between sheet metal electrodes, the following problems arise.

Firstly, the sheet metal electrodes 8 are exposed to the atmosphere, and dew or water drops may be formed between the sheet metal electrodes depending on the ambient humidity. Accordingly, the electrostatic capacity between the sheet metal electrodes varies, and the weight of the object cannot be detected accurately. Specifically, the cooking appliance is installed in a kitchen, and is exposed to steam generated from food, and the humidity varies significantly, making it difficult to detect the weight of the object accurately.

Secondly, when dust is deposited on the sheet metal electrodes 8 and absorbs moisture, the electrostatic capacity between the sheet metal electrodes varies, making it impossible to measure the weight of the object correctly.

Thirdly, the sheet metal electrodes have large dimensions, measuring in a range from about 50 mm by 50 mm to 100 mm by 100 mm, with the electrode gap ranging from 5 to 10 mm. Changes in the electrode gap caused by the load are about 2 to 3 mm, and in order to detect variations of electrostatic capacity, the electrodes are required to have a large area. Because the area of the electrodes is large and the dislocation between the electrodes is large, it is difficult to isolate the electrodes from fresh air to eliminate the effects of humidity. Thus, in the conventional device, since measures against the exposure of the electrodes to dust and humidity were difficult to take, it was extremely hard to detect the weight of the object accurately.

SUMMARY OF THE INVENTION

In light of the problems associated with the prior art, it is hence a primary object of this invention to provide an apparatus capable of making accurate weight measurements by eliminating the effects of deposited moisture or dust on the precision of measurement.

That is, the weight detecting apparatus of this invention comprises two flat plates made of an elastic insulator, a pressure sensitive sensor in which these two flat plates are glued parallel to each other at a specified interval by means of spacers and having electrodes formed on the confronting sides of these two flat plates, and a load support means for transmitting and supporting the weight of the object to be measured to these flat plates. In this apparatus, the change in the electrostatic capacity between the electrodes of this pressure sensitive sensor is detected.

In the weight detecting apparatus of this invention, since the functions performed by the leaf springs having elasticity and the sheet metal electrodes in the prior art are performed by a pressure sensitive sensor in the present invention, that is, by two flat plates, electrodes and spacers, it is easy to enclose the electrode gap, and it is possible to eliminate the effects of humidity and dust on the electrostatic capacity between electrodes. Moreover, by opening a small hole in the pressure sensitive sensor to allow air to pass into and out of the electrode gap, barometric changes due to thermal expansion caused by temperature changes in the air between the electrodes may be avoided.

Furthermore, by coating the pressure sensitive sensor with a water-repellant substance, it is possible to eliminate the effects of current loss or the like due to humidity and dust.

By designing the pressurizing part of the pressure sensitive sensor to have a specified size and to receive pressure at a specific location on the pressure sensitive sensor, the apparatus can yield an accurate weight detection. The pressure sensitive sensor generally tends to be influenced with respect to the weight detection depending on the pressurizing location. Besides, weight detection also is influenced depending on the size of the pressurizing part, in particular, the area and shape thereof. Therefore, a stable weight detecting performance may be obtained by selecting a constant size and shape of the pressurizing part and a specified pressurizing location.

The load exerted on the pressure sensitive sensor is applied to one of the flat plates, and this pressure sensitive sensor is supported without any force deforming the other flat plate. The loaded flat plate is deformed due to the load, and the electrostatic capacity varies in amounts corresponding to the change in the gap between the two electrodes, and is detected and the weight is measured. It is not easy, generally, to provide a coefficient of elasticity of the two flat plates which compose the pressure sensitive sensor that is uniform. When force is applied to both plates, a synthetic deformation of the plates occurs, and the change in the electrostatic load depending on the load becomes unstable, and the accuracy of weight detection is diminished. Therefore, by applying a load to only one of the flat plates and supporting the other flat plate so as to be free of load, a stable deformation occurs, and an accurate weight detection may be made. The upper and lower flat plates may have the same thickness, which is advantageous with respect to manufacturing and cost.

Furthermore, to protect the pressure sensitive sensor from an excessive load, the load exerted on the pressure sensitive sensor acts through an elastic body capable of undergoing a large deformatin relative to the deformation of the flat plate of the pressure sensitive sensor, and a stopper is provided as a means of limiting the displacement of the elastic body when the same is deformed. Thus, the pressure sensitive sensor may be protected from an excessive load.

DETAILED DESCRIPTION OF THE PREFERRED EMBODIMENTS

Figure 3:
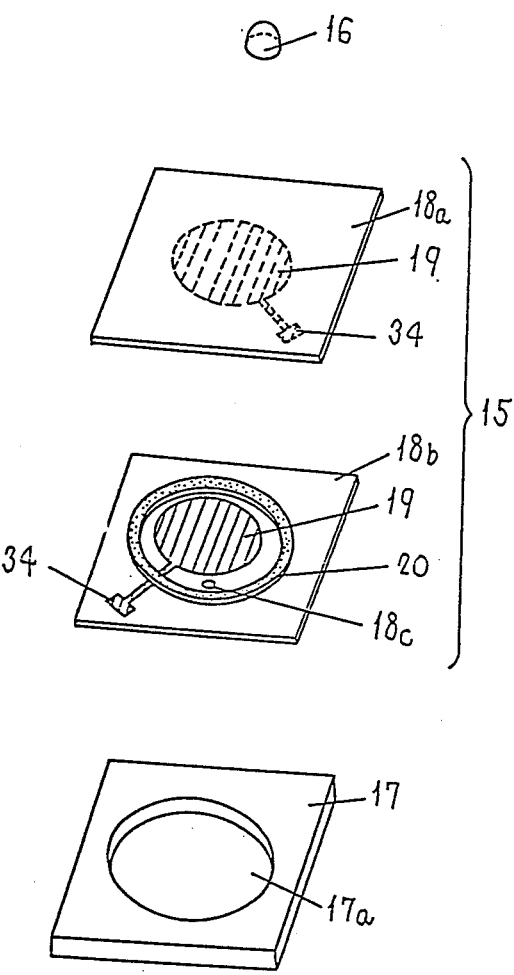
FIG. 3 is an exploded perspective view of a pressure sensitive sensor of a weight detecting apparatus according to one embodiment of the present invention, and of a pressurizing member and a sensor bed as sensor supporting means.

FIG. 3 shows the structure of a pressure sensitive sensor 15 as an embodiment of a weight detecting part capable of undergoing a small dislocation, together with a pressurizing member 16 for transmitting pressure to the pressure sensitive sensor and a sensor bed 17 as a sensor supporting means for supporting the pressure sensitive sensor 15. The pressure sensitive sensor 15 is fabricated by printing an electrode 19 on upper and lower flat plates 18a, 18b which are insulators having elasticity, and gluing the flat plates 18a, 18b together (hereinafter the assembly of the upper and lower flat plates 18a, 18b is called a flat plate 18) by way of a spacer 20. This flat plate 28 may comprise any insulator having elasticity, such as ceramics. In particular, alumina (Al$_2$O$_3$) is preferred.

The conventional sheet metal electrode 8 can range in size from about 50 mm by 50 mm to 100 mm by 100 mm, with an electrode gap of as large as 5 to 10 mm. In this invention, the flat plate 18 is 30 mm by 30 mm, and the electrode gap is as small as 40 to 60 μm, and when the flat plate 18 has a thickness of 0.5 mm, the thickness of the pressure sensitive sensor 15 is only about 1.04 to 1.06 mm. As a result, the electrostatic capacity of the pressure sensitive sensor and its rate of change to load is equal to or even greater than that of the prior art. This is because this two-piece flat plate 18 is glued so as to form a narrow electrode gap of only 40 to 60 μm. The gluing technique may be easily realized by mixing φ40 to 60 μm beads into the spacer 20, similar to the present gluing technique employed for glass plates of liquid crystal displays or the like. Therefore, because of the narrow electrode gap, the electrode area may be smaller but the sensor still has the same electrostatic capacity as in the conventional device. On the other hand, when the two flat plates 18 are made of alumina ceramic having a plate thickness +0.5, the dislocation of the flat plates is very small, for example, about 3 to 10 μm per 1 kg of load. If the dislocation per unit load is small, since the electrode gap itself is small, the rate of change of electrostatic capacity is large, being equal to or even greater than that of the conventional device.

Thus, the function performed by the conventional leaf spring 4 and sheet metal electrode 8 is performed by the pressure sensitive sensor 15 of the invention, and since the size is small and dislocation is small, the electrode gap may be easily enclosed, and the influences of moisture and dust may be eliminated.

That is, in a cooking appliance steam is generated from food, and the humidity in the location at which the appliance is installed, such as in the kitchen, is high. Therefore, dew may condense on the electrode 19 or dust deposited on the electrode 19 may absorb moisture. As a result, the electrostatic capacity between the electrodes would tend to vary. It is therefore desired to isolate the space between the electrodes from the outside air, and the space between the electrodes may be sealed off by means of the flat plate 18 and spacer 20. However, in the cooking appliance, the temperature becomes high and the air in the space between the electrodes is expanded by heat. And if the space is enclosed by a rigid material, the pressure of the air in the space beween the electrodes varies due to the thermal expansion of the air, and the electrostatic capacity may vary due to the deflection of the flat plate 18. To solve these two problems, the electrodes are enclosed by the flat plate 18 and spacer 20 so as to shut out dew and dust, and a hole 18c allows the air to pass into and out of the space when thermal expansion occurs. In FIG. 3, the hole 18c is provided in the lower flat plate 18b, and this flat plate hole 18c should be large enough to allow air to pass into and out of the space due to thermal expansion, but not large enough to admit moisture and dust easily.

Figure 1:
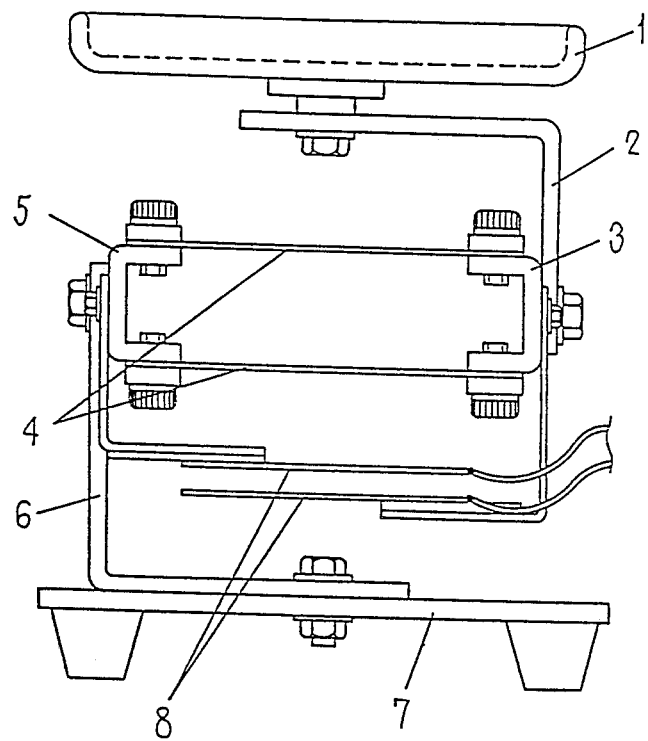
FIG. 1 is a side view showing the struture of a conventional scale.
Figure 2:
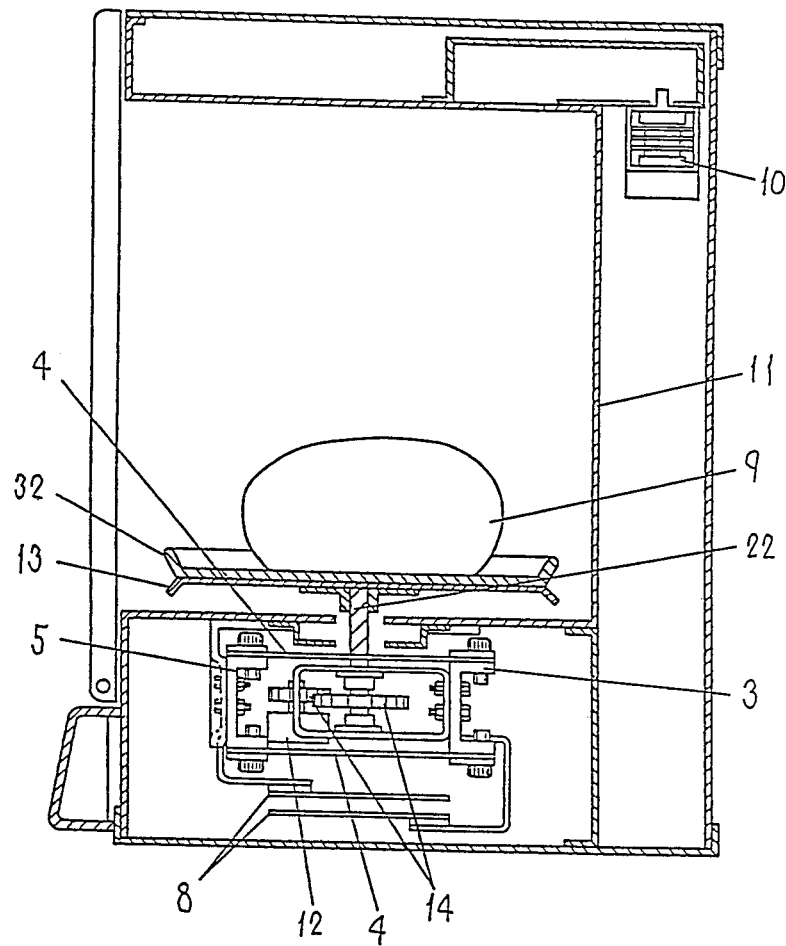
FIG. 2 is a sectional side view showing the conventional weight detecting apparatus mounted on a cooking appliance.
Figure 4:
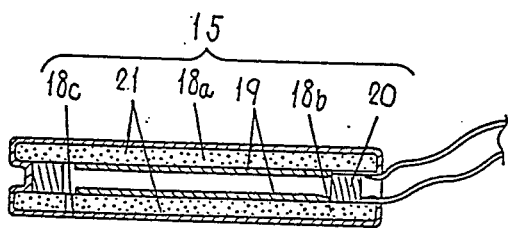
FIG. 4 is a sectional view of the same pressure sensitive sensor.

FIG. 4 is a sectional view showing the composition of this pressure sensitive sensor 15. By coating the outside of the pressure sensitive sensor 15 with a sensor coat 21 (not shown in FIG. 1) made of a water-repellent material, current loss due to dew or dust deposited on the surface of the pressure sensitive sensor 15 may be eliminated, and an accurate weight detection may be enabled. As the material having a water-repellent property, for example, polyimideamide resin, silicon resin, and fluoroplastic may be used.

Figure 5:
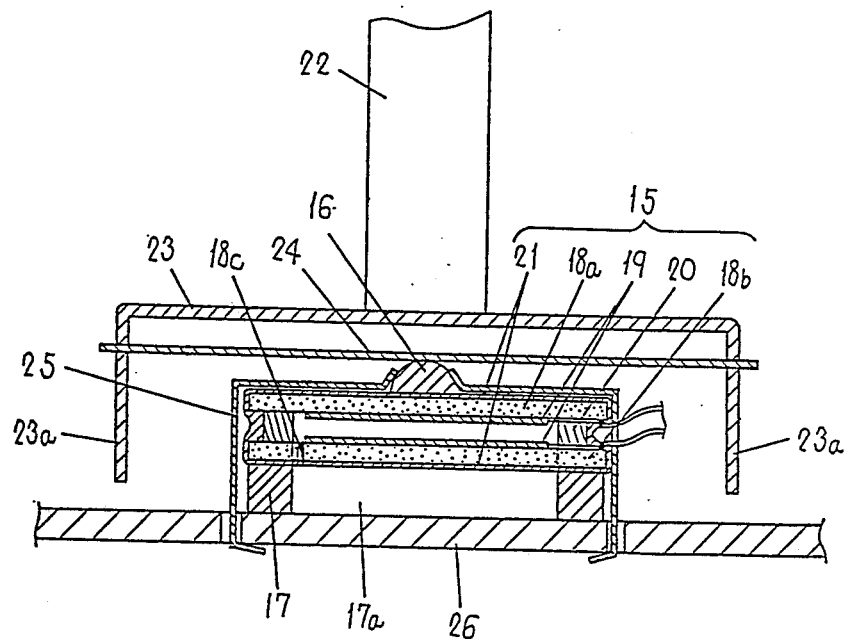
FIG. 5 is a partial sectional view showing a load transmission state of the same pressure sensitive sensor.

FIG. 5 shows an embodiment of a support transmission means of the pressure sensitive sensor 15. The weight of the object to be measured is transmitted from a shaft 22 to a stopper 23 and is applied to the pressurizing member 16 through a protective leaf spring 24 made of an elastic material. The pressurizing member 16 acts on the upper flat plate 18a of the pressure sensitive sensor 15, the upper flat plate 18a is deformed, and the gap between the upper and lower electrodes 19 varies.

This can be detected as a change in the electrostatic capacity of the electrodes.

The deformation corresponding to the load exerted on the upper flat plate 18a of the pressure sensitive sensor 15 varies with the size of the pressurizing member 16, that is, the area over which pressure is exerted on the upper flat plate 18a. The smaller the pressurizing area, the greater the deformation, and the deformation becomes smaller if the pressurizing area is larger.

Also, depending on the location at which pressure is exerted on the upper flat plate 18a, the deformation of the upper flat plate 18a varies. If pressure is exerted in the central area, the deformation is the largest in the central area, and becomes small in a direction extending outward from the center.

Therefore, by selecting the area over which and the location at which pressure is exerted as constants, an accurate weight detection is possible. Accordingly, the pressurizing surface of the pressurizing member 16 is flat having a specified surface area, and the pressurizing location is fixed by a sensor cover 25.

Furthermore, the shape of the surface, contacting the protective leaf spring 24, of the pressurizing member 16 is hemispherical. The surface is hemispherical so that the force applied by the protective leaf spring 24 can be received in the middle of the pressurizing member 16, and so that the pressurizing surface of the pressurizing member 16 can exert pressure on the upper flat plate 18a uniformly. Therefore, if the object to be measured is put on a position offset from the shaft 22 and the protective leaf spring 24 is inclined, pressure is transmitted nearly to the center of the pressurizing member 16, and the pressure exerted on the upper flat plate 18a is nearly uniform. The shape of this pressurizing member 16 may not be necessarily hemispherical. That is, the same effect may be obtained by designing the surface of the member 16 that receives load from the protective leaf spring to have an area sufficiently smaller than that of the pressurizing surface at which pressure is exerted on the upper flat plate 18a.

The lower flat plate 18b is supported by the sensor bed 17 as a sensor support means. A hole 17a is open in this sensor bed 17 which extends beneath the part of the lower flat plate 18b contacting the spacer 20. By supporting the pressure sensitive sensor 15 with the hole 17a in the part of the sensor bed 17 opposing only the inside part of the lower flat plate 18b, force is not applied to the deformable part of the lower flat plate 18b. In other words, the load applied to the shaft 22 is applied to the pressurizing member 16 by way of stopper 23 and protective leaf spring 24. The load of the pressurizing member 16 is applied to the upper flat plate 18a which makes up the pressure sensitive sensor 15. Since the upper flat plate 18a is supported at its circumferential portion by the spacer 20, force is applied to a portion of flat plate 18a inside the spacer 20, that is, the part sensitive to pressure, and deformation occurs. This load is transmitted to the lower flat plate 18b through spacer 20. However, the lower flat plate 18b contacting the spacer 20 is supported by sensor bed 17, and the part of the lower flat plate 18b that is deformable under pressure, that is, the part disposed inside of spacer 20 is above the hole 17a of the sensor bed so that deformation does not occur. As a result, only the upper flat plate 18a is deformed, and the lower flat plate 18b is not deformed.

If the sensor bed hole 17a is not provided in the sensor bed 17, that is, if the sensor bed is a solid flat plate, the sensor bed 17 and the lower flat plate 18a could rarely be perfectly parallel. If the sensor bed 17 is warped at the upper side, the lower flat plate 18a would be pushed up and deformed. If there is foreign matter in the sensor bed 17, or if the sensor bed 17 surface is not smooth due to damage or the like, the lower flat plate 18b would be similarly deformed. If the both flat plates 18a, 18b are deformed, the constant of elasticity may be different between the two, and the pressing position of the lower flat plate 18a may differ due to foreign matter or warpage. Therefore, synthetic complicated changes in the electrostatic capacity of the upper and lower flat plates 18a, 18b may occur, and unstable changes may take plate. In such a case, it is difficult to detect the weight of an object accurately.

Thus, in order to enable the apparatus to detect the weight of an object accurately, it is important that only one of the flat plates be deformed. Moreover, by supporting the apparatus so that only one flat plate may be deformed, the upper and lower flat plates may have the same thickness, and it is possible to assemble the apparatus without distinguishing the upper and lower plates, thereby lowering the cost associated with assembly, too.

To protect the apparatus from an excess load, when a specified load is applied, the protective leaf spring 24 is deformed, and its part attached to the stopper 23 is displaced downward. As a result, a stopper element 23a as a displacement limiting means provided in the stopper 23 hits a sensor support 26, and the portion of the actual load exceeding the specified load is received by the stopper element 23a, while the specified load is exerted on the pressure sensitive sensor 15. The deformation of the pressure sensitive sensor 15 is very small as described above, and the deformation of the protective leaf spring 24 is set to be rather large, about 0.2 to 1 mm per 1 kg for sensor 15, with respect to about 3 to 10 $\mu$m per 1 kg for leaf spring 24. Since the pressure sensitive sensor 15 is capable of undergoing only a very small deformation, the dimensional precision of the stopper element 23a enabling operation at a specified load must be accurate without the presence of protective leaf spring 24, which is difficult to realize. That is, the clearance between the stopper element 23a and the sensor support 26 must be accurately set to within $\mu$m. However, deformation of the protective leaf spring 24 is about 0.2 to 1 mm per 1 kg, and the precision of the opertional distance of stopper element 23a is about 0.1 mm, so that the operation of the stopper element is accomplished.

Figure 6:
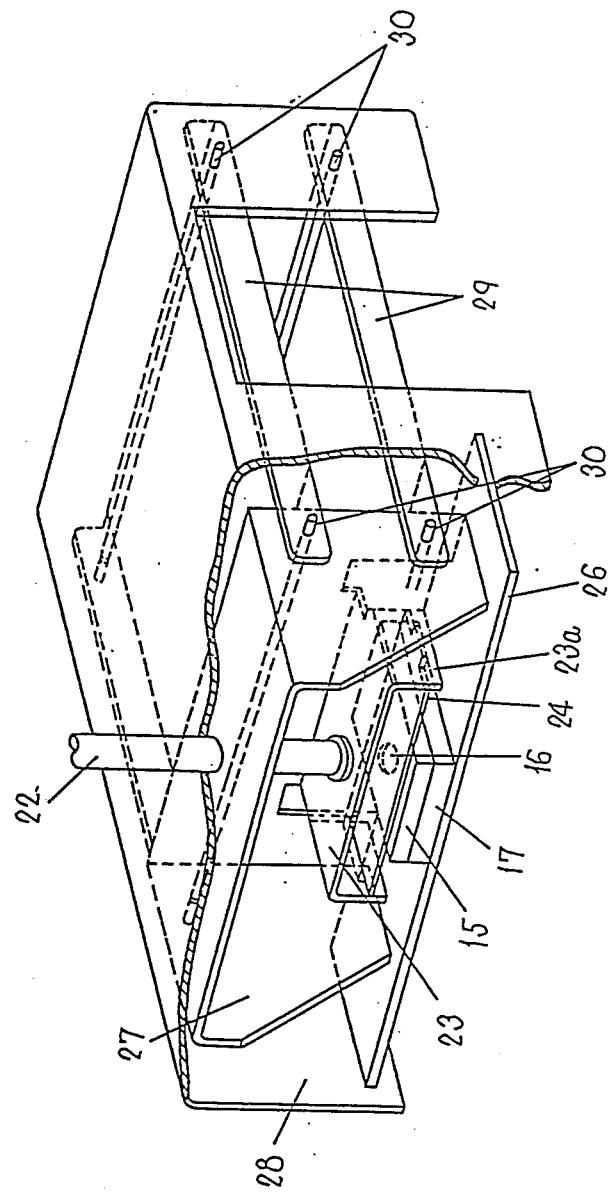
FIG. 6 is a partial broken away perspective view showing the pressure sensitive sensor and the supporting mechanism as a load supporting means.
Figure 7:
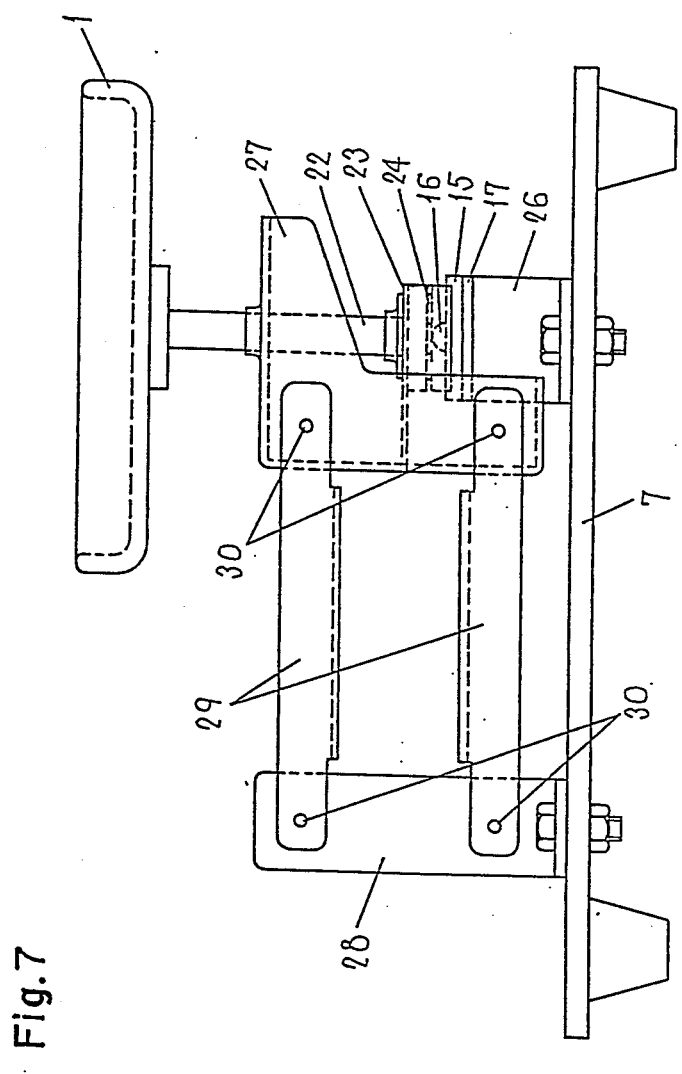
FIG. 7 is a side view showing the weight detecting apparatus mounted on a scale.

FIG. 6 is a partially broken way perspective view showing the support transmission mechanism to transmit the load to the pressure sensitive sensor 15 as mentioned in the description of FIG. 5. FIG. 7 is a side view of an embodiment of the application of the present invention to a scale. When conducting an actual weight measurement, the object to be measured is not always put in the center of a tray 1. Therefore, regardless of the mounting position, the load must be accurately concentrated and transmitted to the pressure sensitive sensor 15. For this purpose, the so-called Roberval mechanism used generally in scales is known. Its advantages are that the weight can be detected accurately regardless of the mounting position, and that the weighing platform is displaced while remaining parallel. In the Roberval mechanism, four corners of a parallelogram linkage are set in movable state, one side is fixed, and its confronting side is movable. In FIG. 6, a parallel movement piece 27 is the movable side, and confronting support 28 is the fixed side. Two parallel holding pieces 29 are fastened at four corners by pins 30, thereby making up a parallelogram linkage. A shaft 22 is attached to the parallel movement piece 27, so that the load may be transmitted to the pressure sensitive sensor 15.

Thus, by employing the Roberval mechanism, the load may be concentrated on a small pressure sensitive sensor 15 regardless of the mounting position of an object to be weighed, so that an accurate weight measurement may be made.

Figure 8:
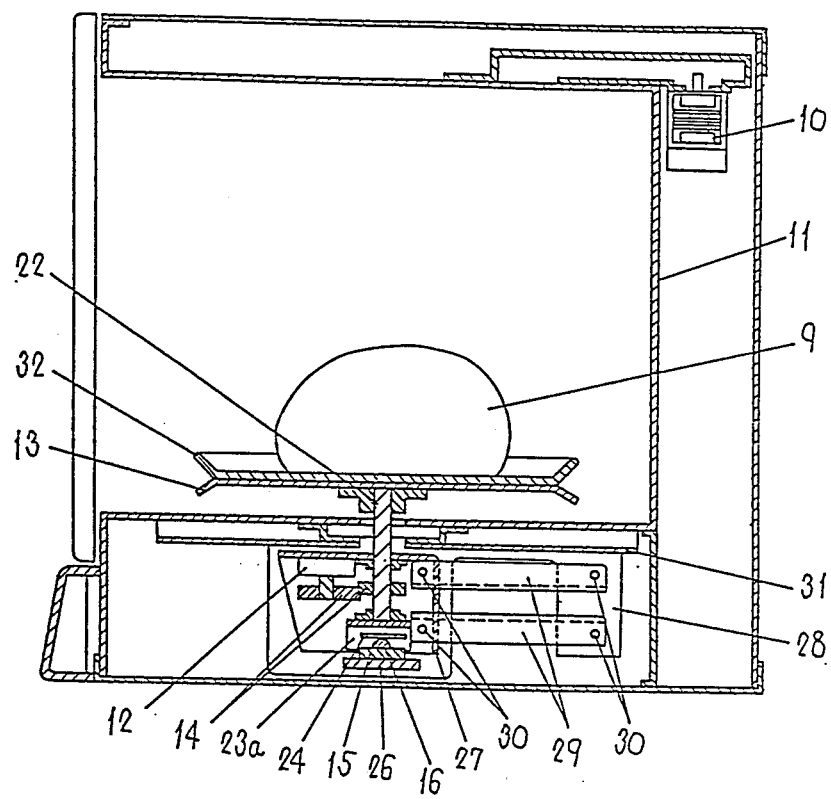
FIG. 8 is a side sectional view showing the weight detecting apparatus mounted on a cooking appliance.

FIG. 8 is a side sectional view showing an example of mounting the weight detecting apparatus of this invention on a cooking appliance. The apparatus is fitted to the bottom of a heating compartment 11 by way of a chassis 31, and a motor 12 and gear 14 for rotating a turntable 13 are attached to the parallel movement piece 27. The output of a magnetron 10 is properly controlled by detecting the weight of food placed on a scale plate 32 and turntable 13, and the weight may be measured accurately without being influenced by moisture or dust, so that the cooking performance of the appliance is improved, too. And, it is not necessary to put the food in the center of scale plate 32, so that a very easy-to-use cooking appliance is presented.

Figure 9:
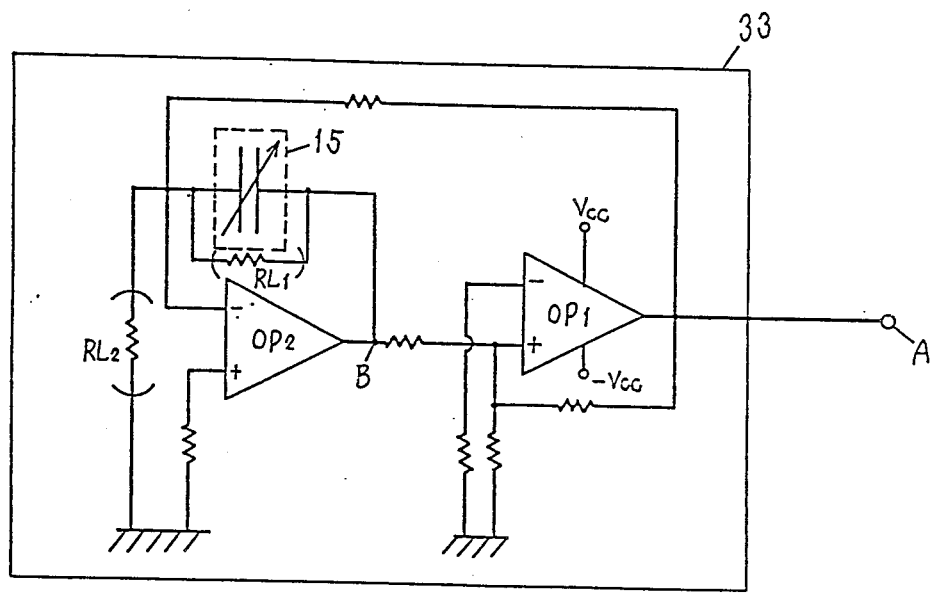
FIG. 9 is a circuit diagram showing an oscillation circuit.
Figure 10:
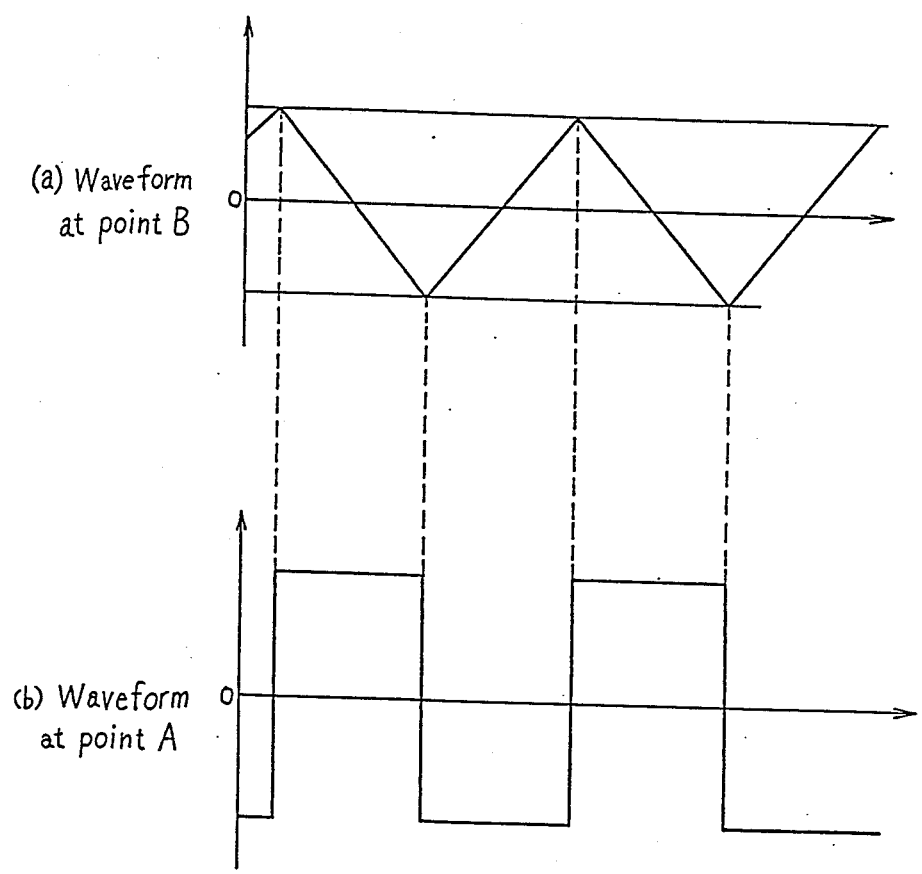
FIG. 10 is an output waveform diagram of the oscillation circuit.

FIG. 9 shows an oscilation circuit 33 for converting the change in electrostatic capacity of pressure sensitive sensor 15 into an oscillation frequency, i.e. for converting the weight of an object into a frequency. Using two operational amplifiers OP1, OP2, the change in the charging and discharging time corresponding to the electrostatic capacity of the pressure sensitive sensor 15 is converted into an oscillation frequency. FIG. 10 shows output waveforms of operational amplifiers OP1, OP2. FIG. 10a is a voltage waveform at output point B of OP2, while FIG. 10b is a voltage waveform at output point A of OP1. The OP2 makes up an integrating circuit, and it receives the output of OP1. And the OP1 makes up a comparator circuit possessing a hysteresis characteristic, and it receives the output of OP2. Thus forming a loop, the oscillation circuit is established.

If there is no sensor coat 21 in the pressure sensitive sensor 15, loss occurs, as indicated by RL1, RL2 in FIG. 9 due to moisture and condensation, and the frequency conversion is disturbed. This loss occurs between the electrode terminals 34 (electrode terminals 34 are shown in FIG. 3). Therefore, in this embodiment, RL1, RL2 are eliminated by a sensor coat 21, so that a correct weight measurement can be made.

Figure 11:
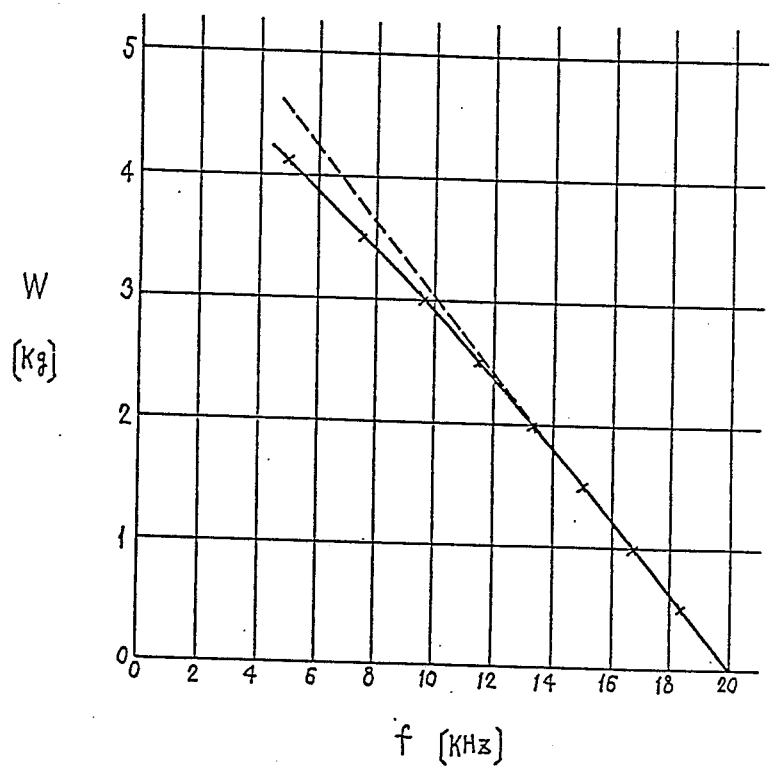
FIG. 11 is a graph showing the correlation between weight and oscillation frequency.

FIG. 11 is a graph showing the relation between an oscillation frequency f and the weight W of the object, in which the dotted line is a straight line reference. Therefore, the f-W characteristic is rather curved. The performance will come out as a straight line, indicated by the dotted line, if the gap between electrodes 19 in the pressure sensitive sensor 15 varies while the electrodes 19 remain parallel. Actually, however, since the periphery of electrodes 19 is supported by the spacer 20, the parallel state of electrodes 19 is not maintained, and a deformation occurs that is large in the central part and smaller going away from the center. Therefore, a slightly curved performance is obtained as indicated by the solid line.

Figure 12:
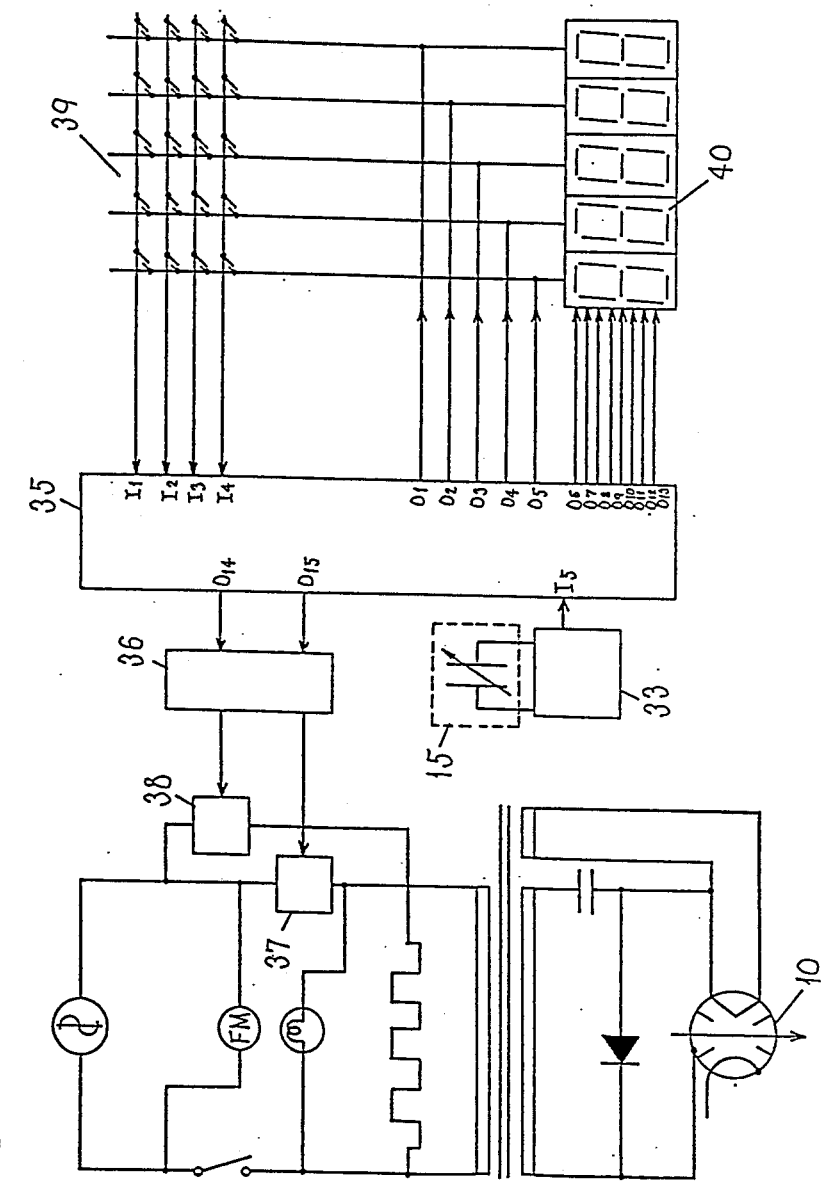
FIG. 12 ia control circuit diagram of a cooking appliance on which the weight detecting apparatus is mounted.

FIG. 12 is a circuit diagram showing a control circuit of a cooking appliance on which the weight detecting apparatus of this invention is mounted. The change in electrostatic capacity of pressure sensitive sensor 15 is converted into a frequency in the oscillation circuit 33, and it is counted by a microcomputer 35, and the weight corresponding to the frequency is calculated. In the microcomputer 35, the f-W characteristic shown in FIG. 11 is stored. This f-W characteristic is stored in the form of a quadratic approximation formula $W = Af^2 + Bf + C$ (where A, B, C are constants). The signal for controlling the output of magnetron 10 and other elements in response to the weight is delivered to a drive circuit 36. The signal of the drive circuit 36 drives a magnetron output control relay 37 and a heat output control relay 38. Numeral 39 refers to an operation unit having keys for inputting information into the cooking appliance, and 40 is a display unit indicating the heating time and other information.

As is clear from the foregoing description, this invention enables the weight of an object to be detected accurately. Therefore, the applications of the present invention are not limited to a scale alone, but include a wide scope of fields in which the weight of an object is detected and effectively utilized. For example, when mounted on a cooking appliance, it is possible to detect the weight of food in the heating compartment, control the output accordingly, the enhance the cooking performance s a result. Thus, this invention is intended to be utilized as a means of enhancing the function of a device by detecting the weight of an object and effectively utilizing the weight information.

We claim:

1. A weight detecting apparatus comprising:
two elastic flat plates each comprising an insulator;
an electrode disposed on a respective surface of each of said flat plates, the respective surfaces of said flat plates facing each other in the apparatus;
a spacer supporting said flat plates in a spaced apart relationship in which a gap extends between said electrodes, said spacer and said flat plates forming an enclosure that encloses said gap and substantially isolates said electrodes from the effects of humidity and dust;
load support means operatively connected to said flat plates for supporting an object to be weighed and for transmitting a load exerted by a supported object to one of said flat plates;
detecting means operatively electrically connected to said electrodes for detecting the capacitance between said electrodes when said electrodes are oppositely charged by a voltage source; and
converting means operatively connected to said detecting means for converting the capacitance detected by said detecting means into a signal corresponding to the weight of an object when the object is supported by said supporting means.

2. A weight detecting apparatus as claimed in claim 1, wherein the enclosure has a hole extending therethrough open to said gap for allowing air to pass into and out of said gap.

3. A weight detecting apparatus as claimed in claim 1, wherein said flat plates comprise ceramics.

4. A weight detecting apparatus as claimed in claim 1, wherein each of said flat plates has a layer of water-repellent material disposed thereon.

5. A weight detecting apparatus comprising:
a pressure sensitive sensor means for converting pressure applied thereto into an electric signal;
sensor support means supporting said pressure sensitive sensor;
a load support means for supporting an object to be weighed;

a pressurizing member operatively connecting said load support means and said pressure sensitive sensor means for transmitting a load exerted by an object to be weighed supported by said load support means to said pressure sensitive sensor, said pressurizing member being generally hemispherical and comprising a curved top portion contacting said load support means and a flat bottom portion contacting said pressure sensitive sensor means;

a detecting circuit means operatively electrically connected to said pressure sensitive sensor means for detecting the electric signal produced by said pressure sensitive sensor means; and converting circuit means operatively electrically connected to said detecting circuit means for converting the electric signal detected into a signal corresponding to the weight of the object supported by said load support means.

6. A weight detecting apparatus as claimed in claim 5, wherein said pressure sensitive sensor means includes two elastic flat plates each comprising an insulator, an electrode disposed on a respective surface of each of said flat plates, the respective surfaces of said flat plates facing each other in the apparatus, and a spacer supporting said flat plates in a spaced apart relationship in which a gap is defined between said electrodes; and wherein said detecting circuit means detects the capacitance between said electrodes when said electrodes are oppositely charged by a voltage source.

7. A weight detecting apparatus as claimed in claim 6, wherein said pressure sensitive sensor means has a bottom portion, and said sensor support means supports said pressure sensitive sensor means along the periphery of said bottom portion.

8. A weight detecting apparatus as claimed in claim 7, wherein said pressurizing member contacts one of said flat plates, the other of said flat plates defines the bottom portion of said pressure sensitive sensor means and is supported by said sensor support means, and said spacer isolates said other of said flat plates from loads transmitted by said pressurizing member to said one of said flat plates.

9. A weight detecting apparatus as claimed in claim 7, wherein said two flat plates of said pressure sensitive sensor means have the same thickness.

10. A weight detecting apparatus as claimed in claim 7, wherein said load support means is a Roberval mechanism.

11. A weight detecting apparatus comprising:

a pressure sensor including a pair of elastic plates each comprising an insulator, an electrode disposed on each of respective surfaces of said flat plates which surfaces face each other in the apparatus, and a spacer supporting said flat plates in an opposing relationship, said electrodes spaced apart over a distance corresponding to an electrostatic capacity of the electrodes, said spacer extending around said electrodes and forming an enclosure with said flat plates that substantially prevents the electrostatic capacity of the electrodes from being influenced by changes in humidity or contaminating material;

load support means operatively connected to said pressure sensor for supporting an object to be weighed and for transmitting a load exerted by a supported object to one of said flat plates which results in a change in the distance at which said electrodes are spaced apart of an amount corresponding to the weight of the supported object; and signal conversion means operatively electrically connected to said electrodes for converting the capacitance of said electrodes, when said electrodes are oppositely charged by a voltage source, into a signal indicative of the weight of an object when the object is supported by said load support means.

12. A weight detecting apparatus as claimed in claim 11, and further comprising an elastic body interposed between said load support means and said pressure sensor in a manner in which said elastic body transmits the load of an object to be weighed from said load support means to said pressure sensor, said elastic body having a higher degree of resiliency than said one flat plate, and stop means connected to said elastic body for preventing the transmission of the load by said elastic body from said load support means to said pressure sensor when said elastic body deforms more than a predetermined amount.

* * * * *